United States Patent [19]

Shimoyama

[11] Patent Number: 5,084,772
[45] Date of Patent: Jan. 28, 1992

[54] SHADING CORRECTING METHOD IN IMAGE READING DEVICE

[75] Inventor: Yuji Shimoyama, Kanagawa, Japan

[73] Assignee: Fuji Photo Film Co., Ltd., Kanagawa, Japan

[21] Appl. No.: 633,207

[22] Filed: Dec. 31, 1990

Related U.S. Application Data

[63] Continuation of Ser. No. 7,115,724, Nov. 2, 1987, abandoned.

[30] Foreign Application Priority Data

Oct. 31, 1986 [JP] Japan ................................ 61-261433

[51] Int. Cl.⁵ ............................................. H04N 1/40
[52] U.S. Cl. ..................................... 358/461; 358/475
[58] Field of Search ............... 358/160, 163, 280, 282, 358/284, 213.19, 213.18, 228, 461, 475

[56] References Cited

U.S. PATENT DOCUMENTS

| | | | |
|---|---|---|---|
| 4,158,859 | 6/1979 | Kerbel | 358/228 |
| 4,408,231 | 10/1983 | Bushaw et al. | 358/475 |
| 4,520,395 | 5/1985 | Abe | 358/163 |
| 4,618,254 | 10/1986 | Therrien et al. | 358/213.19 |

FOREIGN PATENT DOCUMENTS 0263575 12/1985 Japan ................................ 358/280

OTHER PUBLICATIONS

Dattilo et al., "Variable Intensity Illumination Scanner Calibration System", IBM Technical Disclosure Bulletin, vol. 21, No. 9, Feb. 1979, pp. 3546-3547.

Primary Examiner—James J. Groody
Assistant Examiner—David E. Harvey
Attorney, Agent, or Firm—Sughrue, Mion, Zinn Macpeak & Seas

[57] ABSTRACT

An original document image is irradiated with light emitted from a light source, and light reflected from or passed through the original document image is applied to a line sensor for reading the image. A maximum output value of the line sensor is determined within a linear characteristic region thereof with respect to the amount of exposure of the line sensor to the light reflected from or passed through the original document image. The amount of light emitted from the light source is regulated within the maximum output value to determine a sensitivity correcting value for the line sensor with respect to a reference object, and the sensitivity correcting value is stored as corrective data. An image signal from the line sensor is corrected with the corrective data when the original document image is read.

1 Claim, 3 Drawing Sheets

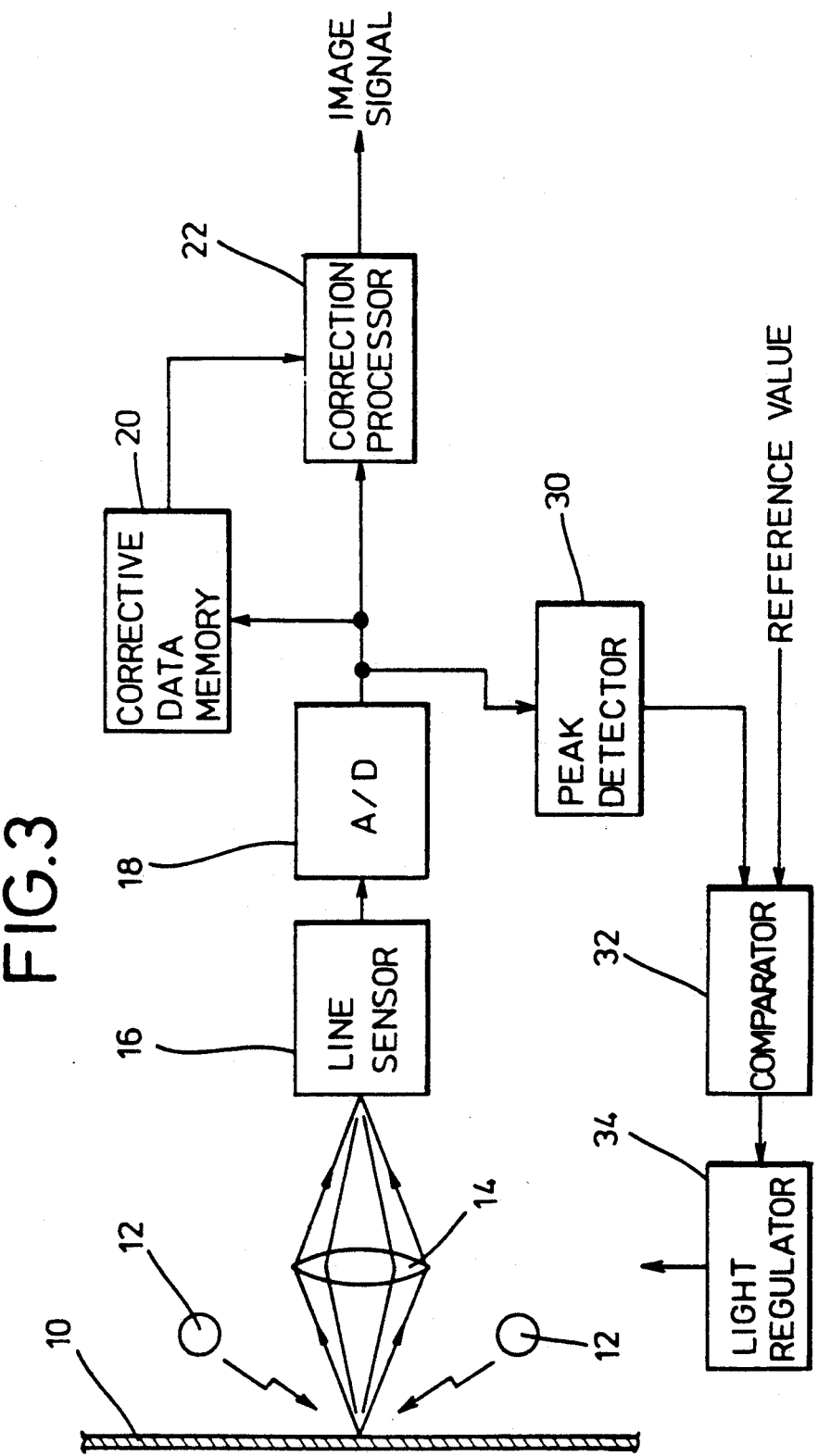

SHADING CORRECTING METHOD IN IMAGE READING DEVICE

This is a continuation of application Ser. No. 07/115,724, filed Nov. 2, 1987, now abandoned.

BACKGROUND OF THE INVENTION

The present invention relates to a method of correcting irregularities in the sensitivity of a line sensor for reading characters, images, and the like on an original document in a facsimile transmitter a plate-making image scanning apparatus, etc., and more particularly to a shading correcting method in an image reading device wherein an original document is irradiated by a light source such as a lamp, and light that has been reflected by or passed through the original document is led to a photoelectric transducer or line sensor for reading image information on the original document, the method comprising reading corrective data stored in a data memory for correcting the sensitivity of photoelectric transduction elements of the line sensor, and correcting an image signal from the light sensor with the read-out corrective data.

In printing and platemaking industries, image scanning recording/reproducing systems are widely used for electrically processing image information on original documents to produce film plates with a view to simplifying the operation process and increasing the image quality.

Such an image scanning recording/reproducing system is basically constructed of an image reading device and an image reproducing device. In the image reading device, image information on an original document which is fed in an auxiliary scanning direction is scanned by a line sensor in a main direction that is substantially normal to the auxiliary scanning direction, so that the image information can be converted to an electric signal by the light sensor. Then, the image information which has been photoelectrically converted by the image reading device is subject to various processes such as for gradation correction, profile emphasis, and the like dependent on platemaking conditions in the image reproducing device Thereafter, the image information thus processed is converted to a light signal represented by a laser beam, which is applied to an image recording carrier of a photosensitive material such a photographic film to record the image information thereon. The image recorded on the image recording carrier is then developed by an image developing device, and the developed image recording carrier is used as a film plate for printing operation.

The line sensor used for scanning the original document in the main scanning direction to read the image information in the image reading device, generally comprises a CCD (charge-coupled device) having an array of photoelectric transduction elements arranged in the main scanning direction. The photoelectric transduction elements of the CCD have different photoelectric conversion characteristics, respectively. Therefore, even when an original document of uniform density is scanned, the image signal produced by the line sensor may have irregular levels.

One proposed solution to the above problem is the generation of corrective data for correcting reading sensitivity irregularities of the photoelectric transduction elements or light sensitive cells (see Japanese Laid-Open Patent Publication No. 60-77575). FIG. 1 of the accompanying drawings shows such a proposed arrangement.

In FIG. 1, an object 10 from which an image is to be read, such as a reference sheet of paper, i.e., white paper, having a uniform reflecting surface, is irradiated with light from a light source 12, and light reflected from the reference sheet 10 is focused on the light detecting surface of a line sensor 16 having a linear array of photoelectric transduction elements by means of a focusing lens 14. The line sensor 16 is electronically scanned to produce an output which is stored element by element as corrective data in a corrective data memory 20 in preparation for shading correction.

Then, an actual original document is irradiated with light from the light source 12. An image read from the original document and represented by reflected light is focused on the light detecting surface of the line sensor 16 by the focusing lens 14. Then, the line sensor 16 is electronically scanned element by element, and the output from the line sensor 16 is converted to a digital signal by an A/D converter 18. The signal level of photoelectric transduction element is corrected in a correction processor 22 by the corresponding corrective data item stored in the corrective data memory 20 to obtain a reproduced image signal which has been corrected as to shading.

As shown in FIG. 2, the output from the line sensor 16 is saturated when the amount of exposure reaches and exceeds a certain level Therefore, the linear nature of the photoelectric conversion characteristic of the line sensor 16 is lost in the vicinity of the saturated value of the output from the line sensor 16. Curves b represent the photoelectric conversion characteristics of two different photoelectric transduction elements. Therefore, if the amount of exposure to the reflected light of the line sensor is near the saturated level when reading white paper or the like for shading correction, the corrective data stored in the corrective data memory is not appropriate, and no sufficient correction can be made in regions where exposure is low.

SUMMARY OF THE INVENTION

It is a major object of the present invention to provide a shading correcting method in an image reading device, in which a maximum value and a saturated value of the output of a line sensor are compared, and the maximum value of the line sensor output is adjusted such that it comes within a linear region of the photosensitive conversion characteristic of the line sensor, so that shading correction can be effected accurately in all exposure regions.

Another object of the present invention is to provide a method of correcting shading in an image reading device in which an original document image is irradiated with light emitted from a light source, and light reflected from or passed through the original document image is applied to a line sensor of a plurality of photoelectric transduction elements for reading the image, the method comprising the steps of: determining a maximum output value of a plurality of photoelectric transduction elements of the line sensor within a linear characteristic region thereof with respect to the amount of exposure of the photoelectric transduction elements to the light reflected from or passed through the original document image; regulating the amount of light emitted from the light source within the maximum output value to determine a sensitivity correcting value for the line sensor with respect to a reference object, and storing the sensitivity correcting value as corrective data; and correcting an image signal from the photoelectric transduction elements with the corrective data when the original document image is read.

Still another object of the present invention is to provide a method of correcting shading in the image reading device, wherein a maximum amount of exposure is determined in advance within the linear characteristic region thereof with respect to the amount of exposure of a plurality of photoelectric transduction elements to the light reflected from or passed through the original document image, then the amount of light emitted from the light source is regulated so as to be equalized to the maximum amount of exposure, and thereafter the sensitivity correcting value is determined.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a block diagram of an arrangement for effecting correction on a line sensor according to the present invention.

DETAILED DESCRIPTION OF THE PREFERRED EMBODIMENT

Figure 2:
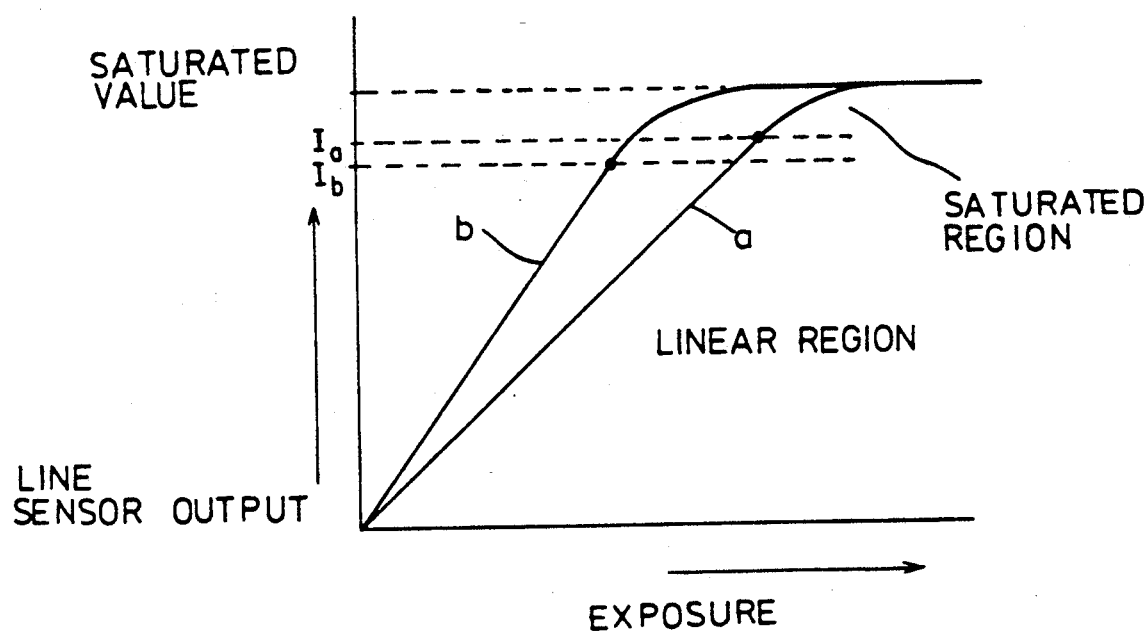
FIG. 2 is a graph showing the relationship between the amount of exposure and the output of a plurality of photoelectric transduction elements.

First, values of the output from a line sensor 16, as they vary with the amount of exposure to reflected light, of the line sensor 16 are measured, and a maximum output value of each photoelectric transduction element making up the line sensor 16 is determined. Then, an output value which is within a linear range is determined based on maximum outputs from each photoelectric transduction element. This determined output value is used as a maximum linear reference value. For example, in FIG. 2 reference letters Ia indicate a maximum value of output from the photoelectric transduction element with a characteristic a, which is within the linear range as opposed to the saturation range, while reference letters Ib indicate a maximum value of output from another photoelectric transduction element with a characteristic b which is also within the linear range. Accordingly, value Ib should be selected as a maximum linear reference value to keep both outputs within the linear range.

Figure 1:
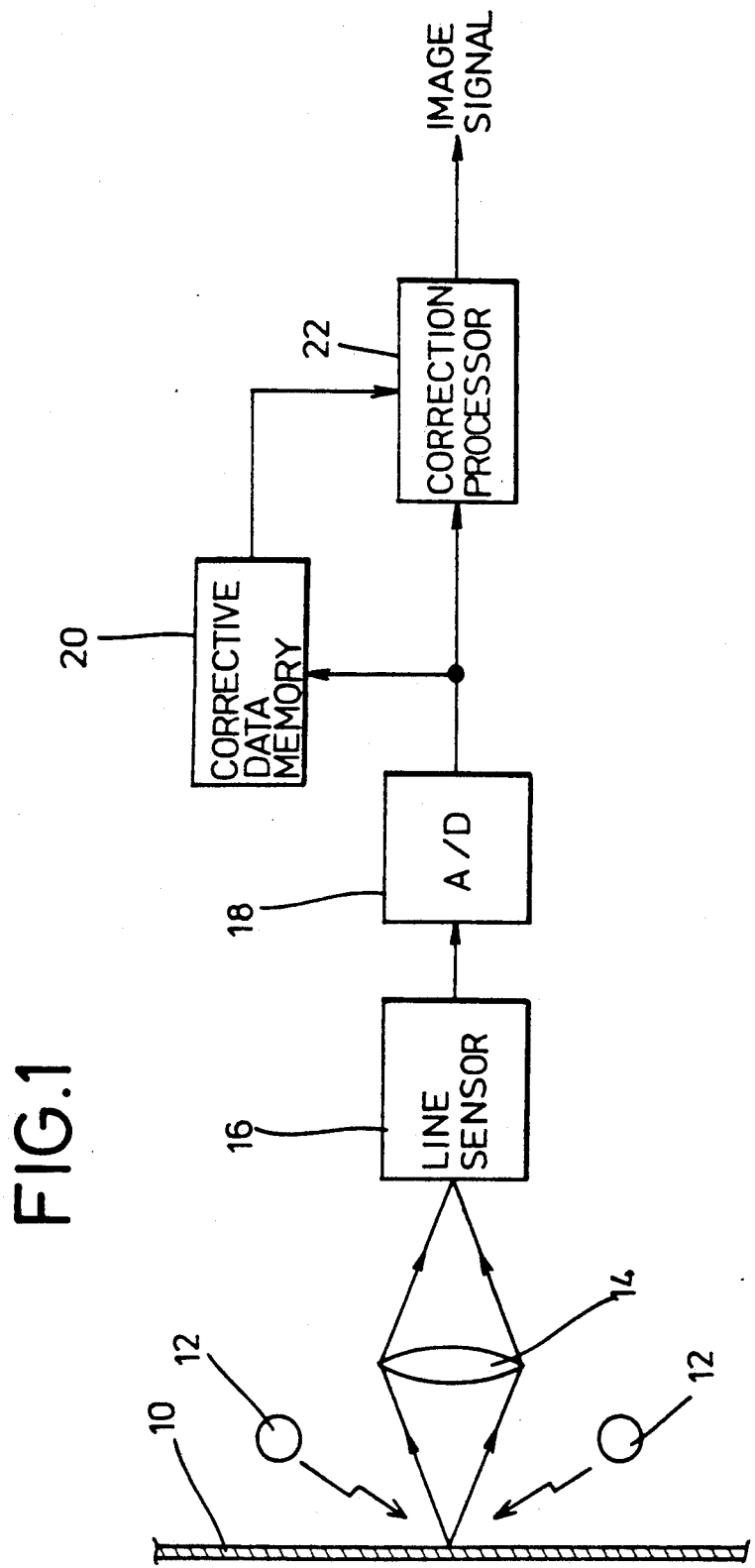
FIG. 1 is a block diagram of a conventional device for effecting shading correction.

Then, as shown in FIG. 3, a reference sheet 10 of paper such as white paper is used as an object from which an image is to be read, and light with a preferred amount of intensity is applied from a light source 12 to the reference sheet 10. Light reflected from the reference sheet 10 passes through a lens 14 which focuses the image of the reference sheet 10 on the light detecting surface of a line sensor 16. The arrangement shown in FIG. 3 is employed to carry out a method of the present invention. Those parts of FIG. 3 which are identical to those of FIG. 1 are denoted by identical reference numerals.

The line sensor 16 is electronically scanned to obtain a signal representative of the image of the reference sheet 10. The signal is then issued photoelectric transduction element by element from the line sensor 16, and converted to a digital value by an A/D converter 18. Thereafter, the peak detector 30 compares the digital values corresponding to the outputs from the elements of line sensor 16 and selects a peak value. This peak value corresponds to the maximum output value output from the elements of line sensor 16. Then, the peak value from the peak-hold circuit is compared with the maximum linear reference value by a comparator 32. If the peak value is smaller than the maximum linear reference value of the line sensor 16 (for example, being smaller than Ib in FIG. 2), then a given amount of light emitted from the light source 12 is automatically increased by a light regulator 34. If the peak value of the output for each element is greater than the maximum linear reference value of the line sensor 16, then a given amount of light emitted from the light source 12 is automatically decreased by the light regulator 34. This operation is repeated several times by repeatedly main scanning the reference sheet 10 to fine tune the light regulation. This light source 12 is regulated in this manner until the peak value of the elements of the line sensor 16 with respect to the reference sheet 10 is equalized to the maximum linear reference value of the line sensor 16.

Then, the reference sheet 10 of white paper is irradiated with light emitted from the light source 12 thus regulated, and reflected light is applied via the focusing lens 14 to the light detecting surface of the line sensor 16. The line sensor 16 is electronically scanned to scan the elements successively, and the output from the line sensor 16 is converted to a digital signal. The values of the output for the respective elements are stored as shading correction data in a corrective data memory 20.

Now, a desired original document is read The original document is set in place of the reference sheet 10, and irradiated with light from the light source 12. Light reflected by the original document is focused by the focusing lens 14 onto the light detecting surface of the line sensor 16, which is electronically scanned to produce a sequential element output signal that is converted to a digital signal by the A/D converter 18. The shading correction data items stored in the corrective data memory 20 are read from the memory 20 for the respective digital image data items. The element image data is then corrected by the shading correction data in a correction processor 22, and issued as a corrected image signal.

According to the shading correcting method of the invention, the maximum output value of a plurality of photoelectronic transduction elements is adjusted so as to come within the linear region of the photoelectric conversion characteristic of the line sensor, the shading correction data is obtained, and then the image signal is corrected by the shading correction data. The relationship between the amount of exposure and the output of the line sensor does not reach a saturated region, but is present in a linear region, and shading correction can be effected by utilizing the maximum amount of exposure. Therefore, it is possible to obtain reproduced images of high accuracy and good quality In the above embodiment, the light regulator is employed as means for irradiating an object with an optimum amount of light However, other means such as a lens diaphragm, a filter, or the like may be used for regulating the amount of light to be applied to the line sensor.

Although a certain preferred embodiment has been shown and described, it should be understood that many changes and modifications may be made therein without departing from the scope of the appended claims.

What is claimed is:

1. A method of correcting shading in an image reading device in which an original document image is irradiated with light emitted from a light source, and light reflected from or passed through the original document image is applied to a line sensor for reading the image, said method comprising the steps of:

determining a maximum output value of said line sensor as a maximum linear reference value when said original document image is irradiated with light emitted from said light source, wherein said line sensor comprises a plurality of photoelectric transduction elements, each having a linear characteristic region and a non-linear saturation region, and wherein said maximum linear reference value is within said linear characteristic region for each of said photoelectric transduction elements;

irradiating a reference sheet with said light source;

electronically scanning each of said plurality of photoelectric transduction elements, comparing the outputs of said elements, and selecting a peak value of said compared outputs of said photoelectric transduction elements;

regulating the amount of light emitted from said light source during said scanning such that said peak value is made equal to said maximum linear reference value;

reradiating said reference sheet with said light source thus regulated in accordance with said regulating step and storing output values for each of said photoelectric transduction elements as corrective data in a corrective data memory; and correcting image signals from said photoelectric transduction elements with said corrective data when said original document is read.

* * * * *